United States Patent
Kang

(10) Patent No.: US 7,365,814 B2
(45) Date of Patent: Apr. 29, 2008

(54) TRANSFLECTIVE TYPE LIQUID CRYSTAL DISPLAY DEVICE

(75) Inventor: Hoon Kang, Gumi-si (KR)

(73) Assignee: LG. Philips LCD Co., Ltd, Seoul (KR)

( * ) Notice: Subject to any disclaimer, the term of this patent is extended or adjusted under 35 U.S.C. 154(b) by 143 days.

(21) Appl. No.: 10/973,358

(22) Filed: Oct. 26, 2004

(65) Prior Publication Data

US 2005/0140872 A1  Jun. 30, 2005

(30) Foreign Application Priority Data

Dec. 30, 2003  (KR) ................ 10-2003-0100692

(51) Int. Cl.
  *G02F 1/1335* (2006.01)
  *G02F 1/1333* (2006.01)

(52) U.S. Cl. .............. 349/114; 349/62; 349/65; 349/96; 349/138; 349/158

(58) Field of Classification Search ............ 349/114, 349/158, 96, 200, 138, 62, 65; 359/618–620, 359/641–642

See application file for complete search history.

(56) References Cited

U.S. PATENT DOCUMENTS 6,011,602 A * 1/2000 Miyashita et al. ............ 349/65
6,295,107 B1 * 9/2001 Watanabe et al. ............ 349/95
6,324,011 B1 * 11/2001 Higuchi ................... 359/627
6,570,634 B2  5/2003 Kim
6,657,700 B2 * 12/2003 Sako et al. ................ 349/158
6,972,827 B2 * 12/2005 Mi .............................. 349/200
7,006,173 B1 * 2/2006 Hiyama et al. ............. 349/96
2001/0024257 A1 * 9/2001 Kubo et al. ................ 349/138
2002/0033918 A1 * 3/2002 Shigeno et al. ............ 349/114
2005/0134769 A1 * 6/2005 Mi .............................. 349/114

FOREIGN PATENT DOCUMENTS

CN    1425946    6/2003

OTHER PUBLICATIONS

Chinese Office Action dated Apr. 27, 2007 for corresponding Chinese Patent Application No. 2004100706887.

* cited by examiner

*Primary Examiner*—Huyen Ngo
(74) *Attorney, Agent, or Firm*—Brinks Hofer Gilson & Lione

(57) ABSTRACT

A liquid crystal display device includes a first substrate, a second substrate facing the first substrate, a liquid crystal layer made of liquid crystals injected between the first and the second substrates, and a backlight assembly arranged on an outer surface of the first substrate. The first substrate has a light guiding pattern containing a periodic structure formed from a medium whose refractive index is different from the refractive index of the first substrate. The light guiding pattern is operative to internally reflect light from the backlight assembly to a transmission region.

28 Claims, 7 Drawing Sheets

Light source

TRANSFLECTIVE TYPE LIQUID CRYSTAL DISPLAY DEVICE

This application claims the benefit of priority to Korean Patent Application No. 2003-100692 filed on Dec. 30, 2003, herein incorporated by reference.

BACKGROUND

1. Field

The present invention relates to a transflective type liquid crystal display device, and more particularly, to a transflective type liquid crystal display device and method for manufacturing the same, capable of optimizing optical efficiency.

2. Description of the Related Art

Generally, liquid crystal display (LCD) devices have advantages such as being lightweight, having a slim profile, and low power consumption, and are widely used for portable computers, office automation equipment, and audio/video apparatuses.

The LCD device includes two substrates and a liquid crystal layer interposed between the two substrates, and displaces liquid crystal molecules using an electric field generated upon application of a voltage. Hence, an image is displayed by manipulating the transmission of light through the liquid crystal.

Since the LCD device does not generate light by itself, it uses ambient light or a backlight assembly for generating light. Generally, the LCD device can be classified into two different categories: a transmission type LCD device or a reflection type LCD device.

FIG. 1 is a cross-sectional view schematically showing a structure of the transmission type LCD device according to the related art. In FIG. 1, the transmission type LCD device includes: a first substrate 102 on which a thin film transistor (TFT) functioning as a switching element is formed on each of intersection points between a plurality of gate lines and data lines; a second substrate 101 which faces the first substrate 102 and on which a black matrix (BM) layer, a color filter layer, and a common electrode are formed; a liquid crystal layer 103 including liquid crystals interposed between the first and the second substrates 102 and 101; first and the second polarizing plates 105 and 104 arranged on an outer surface of each of the first and the second substrates 102 and 101; and a backlight assembly 106 disposed outside the first polarizing plate 105.

An optical transmission axis of the first polarizing plate 105 has an angle of 90° to that of the second polarizing plate 104. The backlight assembly 106 generates light and provides the light toward the first substrate 102.

In the related art LCD device having the foregoing construction, when the TFTs are turned on by a scanning signal applied to the plurality of gate lines and a data voltage applied to the plurality of data lines, the data voltage is applied to pixel electrodes through the turned-on TFTs. At this time, a common voltage is supplied to the common electrode of the second substrate 101. Accordingly, the liquid crystal molecules are controlled by the electric field generated between the pixel electrodes and the common electrode to transmit or block light provided from the backlight assembly 106, so that a predetermined image is displayed.

However, in the transmission type LCD device of the related art, it is difficult to realize slimness and lightweight of the LCD device due to a large volume and a heavy weight of the backlight assembly 106. Also, the power consumption of the backlight assembly 106 increases the overall power consumption of the device by a significant amount.

Therefore, research into reflection type LCD devices using ambient light instead of the backlight assembly 106 is actively performed. Such a reflection type LCD device is widely used as a portable display device such as an electronic organizer and a PDA (Personal Digital Assistant) thanks to low power consumption.

FIG. 2 is a cross-sectional view schematically showing a structure of the reflection type LCD device according to the related art. In FIG. 2, the reflection type LCD device includes: a first substrate 202 on which a thin film transistor (TFT) functioning as a switching element is formed on each of crossing points between a plurality of gate lines and data lines; a second substrate 201 which faces the first substrate 202 and on which a black matrix (BM) layer, a color filter layer, and a common electrode are formed; a liquid crystal layer 203 including liquid crystals interposed between the first and the second substrates 202 and 201; a first and a second polarizing plates 205 and 204 arranged on an outer surface of each of the first and the second substrates 202 and 201; and a reflector 206 disposed outside the first polarizing plate 205.

An optical transmission axis of the first polarizing plate 205 has an angle of 90° to that of the second polarizing plate 204. The reflector 206 reflects light provided from the outside and provides the light toward the first substrate 202.

In the LCD device having the foregoing construction, when a plurality of TFTs are turned on by a scanning signal applied to a plurality of gate lines and a data signal applied to a plurality of data lines, the data signal is applied to pixel electrodes through the turned-on TFTs. At this time, a common voltage is supplied to the common electrode of the second substrate 201. Accordingly, the liquid crystals are controlled by the electric field generated between the pixel electrodes and the common electrode to transmit or block light provided and reflected from the outside, whereby a predetermined image is displayed.

However, in the related art reflection type LCD device, when ambient light does not have a sufficient intensity (for example, the surrounding environment is dim), the brightness level of the display image is lowered and displayed information is not readable, which is problematic.

To resolve the above problems, a transflective type LCD device, which combines the reflection type LCD device and the transmission type LCD device, has been suggested.

FIG. 3 is a cross-sectional view schematically showing a construction of the transflective type LCD device according to the related art. In FIG. 3, the transflective type LCD device includes: a first substrate 330 on which a thin film transistor (TFT) functioning as a switching element is formed on each of crossing points between a plurality of gate lines and data lines; a second substrate 310, which faces the first substrate 330 and on which a black matrix (BM) layer, a color filter layer, and a common electrode are formed; a liquid crystal layer 320 including liquid crystals interposed between the first and the second substrates 330 and 310; a first and a second polarizing plates 331 and 311 arranged on a lower surface of the first substrate 330 and an upper surface of the second substrates 310, respectively; and a backlight assembly 340 disposed outside the first polarizing plate 331.

An optical transmission axis of the first polarizing plate 331 has an angle of 90° to that of the second polarizing plate 311.

On the first substrate 330, a pixel electrode is connected to each TFT. On the pixel electrodes, a passivation layer 322 having a transmission hole 321 exposing a portion (transmission region) of each of the pixel electrodes and a reflector 323 are sequentially formed.

It is assumed that a region corresponding to the reflector 323 is a reflection region 'r' and a region corresponding to the portion of the pixel electrode, exposed by the transmission hole 321, is a transmission region 't'. The reflection region 'r' is the region for reflecting light provided from ambient light in a reflection mode, and the transmission region 't' is the region for transmitting light provided from the backlight assembly 340 in a transmission mode.

At this time, to reduce the difference in the distance that the light travels between the transmission region 't' and the reflection region 'r', the cell gap d1 of the transmission region 't' is about twice that of the cell gap d2 of the reflection region 'r'.

Generally, a phase difference δ of a liquid crystal is obtained by the following formula:

$$\delta = \Delta n \cdot d$$

where δ is the phase difference of a liquid crystal, Δn is the refractive index of a liquid crystal, and d is the cell gap.

Therefore, a difference in optical efficiency is generated between the reflection mode and the transmission mode. To reduce this difference in optical efficiency, the cell gap d1 of the transmission region 't' should be greater than the cell gap d2 of the reflection region 'r' such that the phase difference value of the liquid crystal layer 320 is constant.

However, even though the difference in optical efficiency is reduced by making the cell gap d1 of the transmission region t different from the cell gap d2 of the reflection region r, it is difficult to optimize the transmission region and the reflection region. Therefore, it is difficult to obtain optimized optical efficiency. For example, in the transmission mode, not all of the light provided from the backlight assembly is transmitted through the transmission region, and some of the light impinges on the reflection region and is not transmitted, whereby optical loss occurs. Also, in the reflection mode, not all the ambient light is reflected by the reflector, and some of the ambient light impinges on the backlight assembly through the transmission region, whereby optical loss occurs.

SUMMARY

By way of introduction only, a transflective type LCD device of a first embodiment includes: a first substrate having a light guiding pattern containing a medium whose refractive index is different from a refractive index of the first substrate; a second substrate facing the first substrate; a liquid crystal layer disposed between the first and the second substrates; and a backlight assembly arranged on an outer surface of the first substrate.

A reflector may be formed on a pixel electrode formed on the first substrate such that a reflection region and a transmission region are provided. In this case, the reflector is formed in the reflection region and is not formed in the transmission region.

The reflection region may have a larger width than the transmission region. The light guiding pattern may be formed at the position that corresponds to the transmission region. Also, the refractive index of the light guiding pattern may be at least greater than that of the first substrate. The light guiding pattern may be tapered towards an inside thereof.

According to a second embodiment, a method for manufacturing a transflective type liquid crystal display includes: forming a predetermined pattern on a lower side of the substrate adjacent to a backlight assembly; and forming, in the pattern, a light guiding pattern made of medium whose refractive index is different from the refractive index of the substrate.

In another embodiment, the display device contains a light provider and a substrate having a periodic light guiding pattern formed therein. The light guiding pattern and substrate have different refractive indices that are different enough such that light from the light provider entering the light guiding pattern is directed by total internal reflection towards a front surface of the display device.

In another embodiment, the display device contains a light supplier, a reflector to reflect light from a light source external to the device towards the front surface, and means for redirecting light from the light supplier through total internal reflection towards the front surface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to embodiments of the present invention, examples of which are illustrated in the accompanying drawings.

Figure 1:
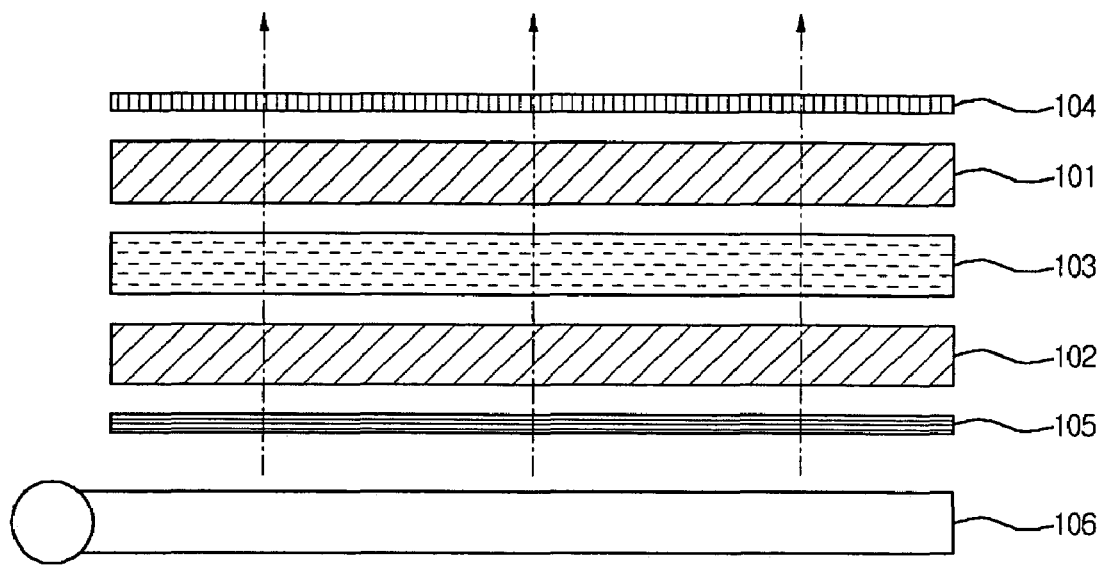
FIG. 1 is a cross-sectional view schematically showing a structure of a transmission type LCD device of the related art.
Figure 2:
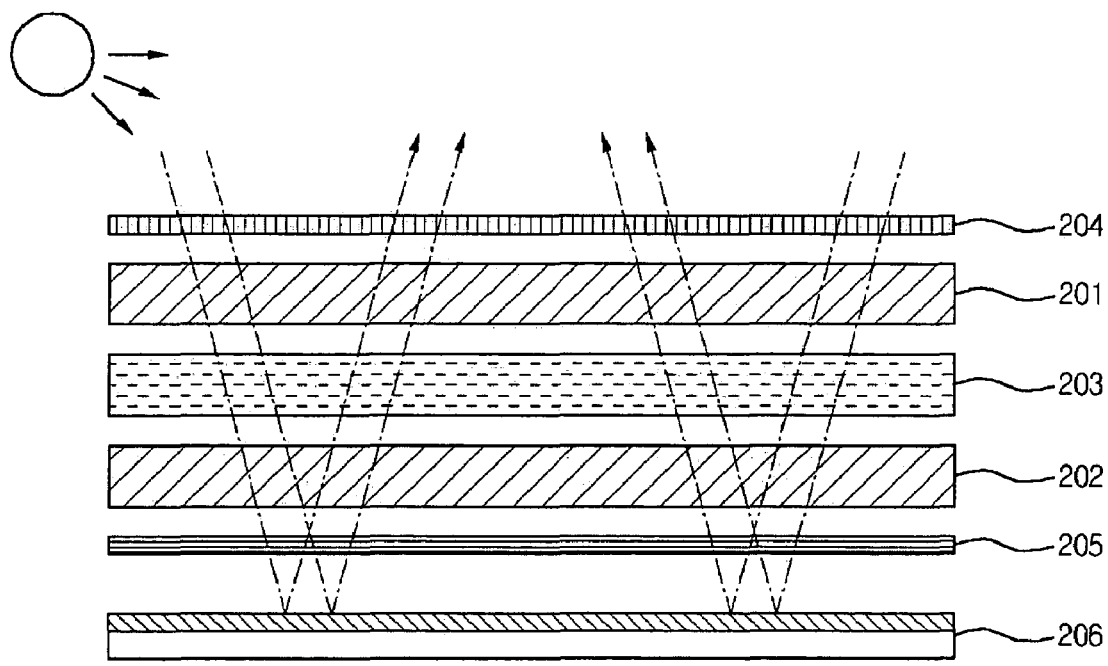
FIG. 2 is a cross-sectional view schematically showing a structure of a reflection type LCD device of the related art.
Figure 3:
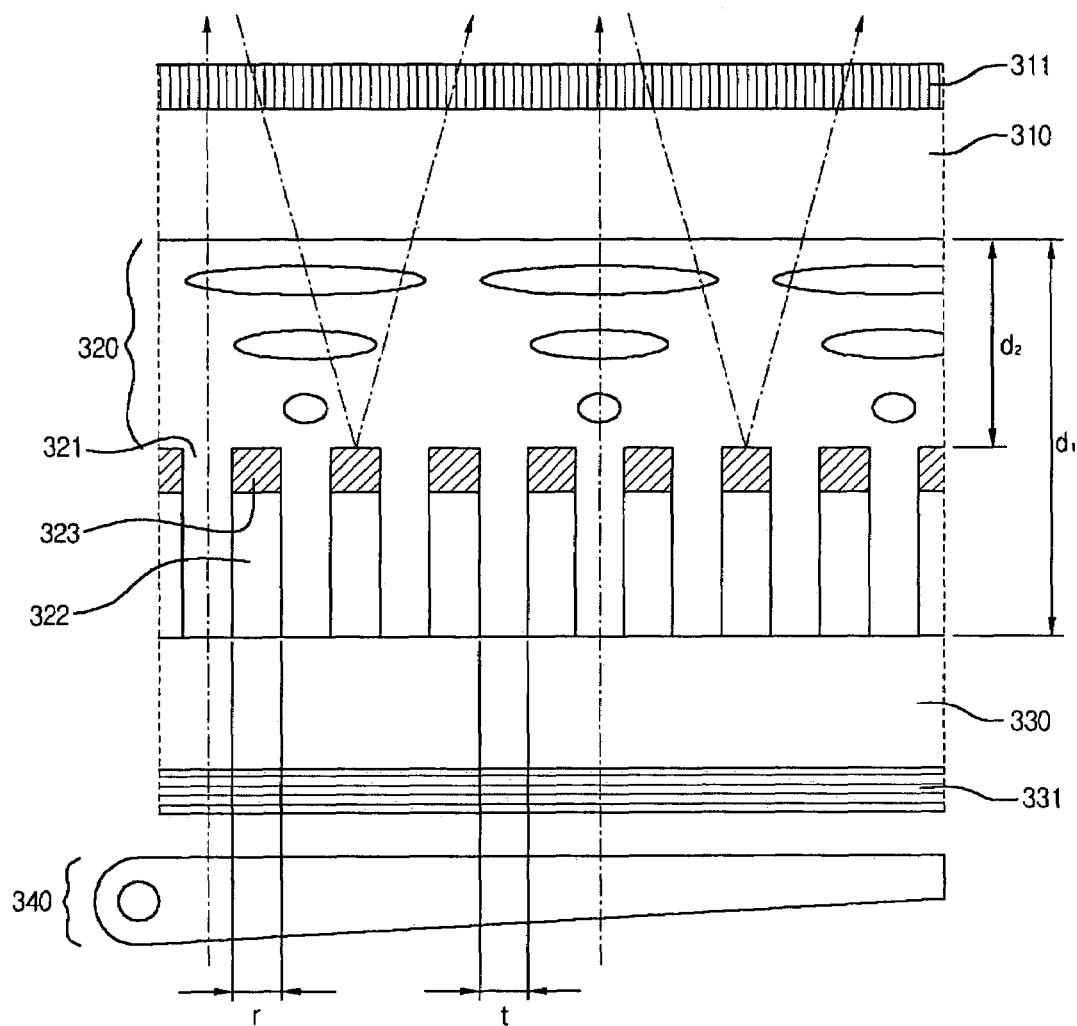
FIG. 3 is a cross-sectional view schematically showing a structure of a transflective type LCD device of the related art.
Figure 4:
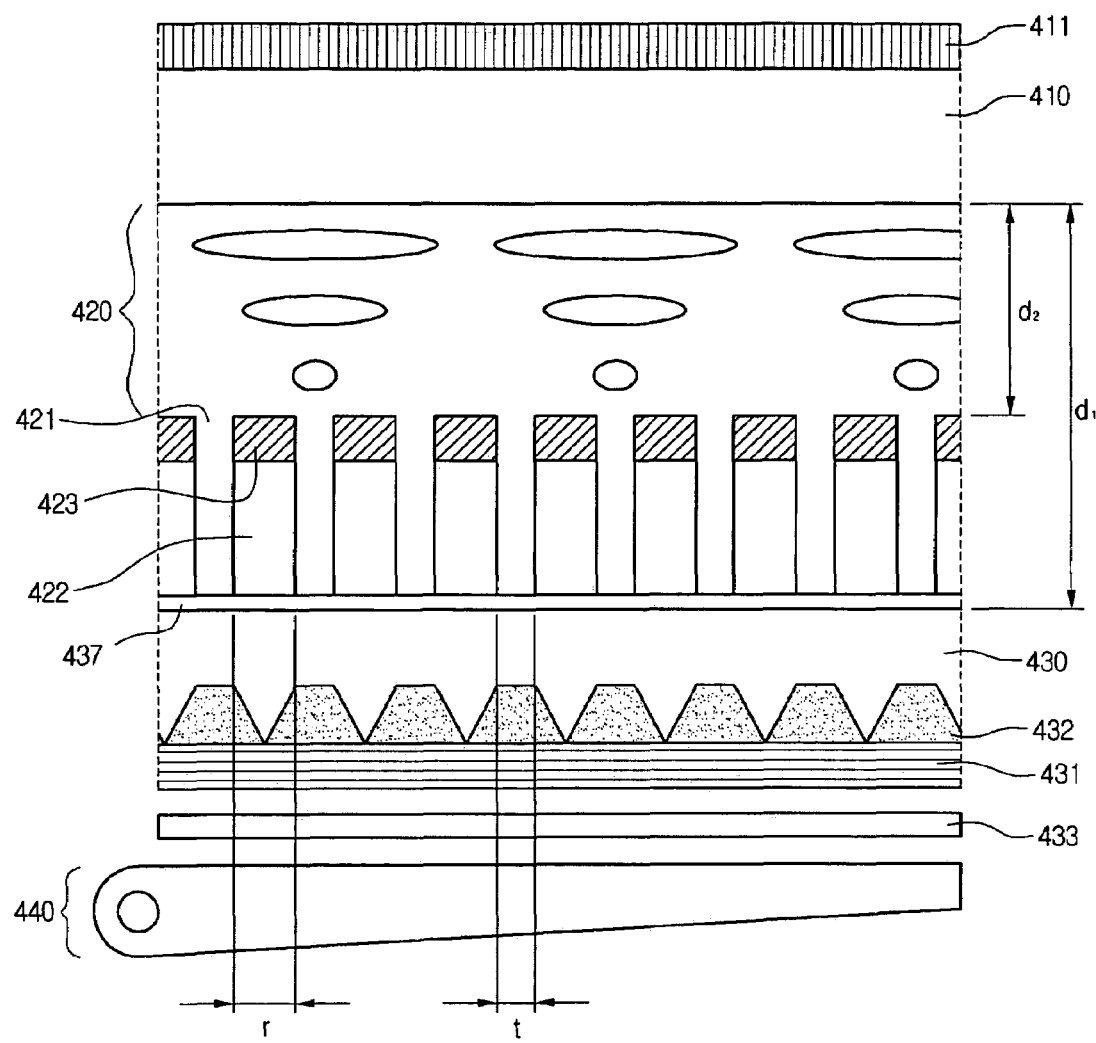
FIG. 4 is a cross-sectional view schematically showing a structure of a transflective type LCD device according to the first embodiment of the present invention.

FIG. 4 is a cross-sectional view schematically showing a structure of a transflective type LCD device according to a first embodiment of the present invention. In FIG. 4, the transflective type LCD device includes: a first substrate 430 on which a thin film transistor (TFT) functioning as a switching element is formed on each of crossing points between a plurality of gate lines and data lines and a pixel electrode 437 is formed; a second substrate 410 facing the first substrate 430 and on which a black matrix (BM) layer, a color filter layer, and a common electrode are formed; a liquid crystal layer 420 including liquid crystals interposed between the first and the second substrates 430 and 410; first and second polarizing plates 431 and 411 arranged on a lower surface of the first substrate 430 and an upper surface of the second substrates 410, respectively; and a backlight assembly 440 disposed on an outer surface of the first polarizing plate 431.

An optical transmission axis of the first polarizing plate 431 has an angle of 90° to that of the second polarizing plate 411.

The transflective type LCD device further includes a collimator 433 disposed between the first polarizing plate 431 and the backlight assembly 440. The collimator 433 modulates an incident angle of light provided from the backlight assembly 440 such that parallel light is incident into the first substrate 430.

Though not shown in FIG. 4, each thin film transistor is connected to a gate line and a data line, and each pixel electrode is connected to the drain electrode of the TFT. Accordingly, the pixel region may include the TFT and the pixel electrode.

The pixel region can be divided into a reflection region 'r' and a transmission region 't'. Namely, a transmission hole 421 exposing a portion of the pixel electrode 437, and a passivation layer 422 and a reflector 423 thereon are alternately arranged on the pixel electrode 437. The region corresponding to the transmission hole 421 exposed by the pixel electrode 437 is the transmission region 't' and the region corresponding to the reflector 423 is the reflection region 'r'. The reflection region 'r' is the region that reflects light provided from ambient light in the reflection mode and the transmission region 't' is the region that transmits light provided from the backlight assembly 440 in the transmission mode.

To reduce the difference between distances traveled by light through the transmission region t and the reflection region r, the cell gap d1 of the transmission region t is about twice that of the cell gap d2 of the reflection region r.

In the embodiment shown, the ratio of the width of the reflection region r to that of the transmission region t is 3:2. Namely, by making the width of the reflection region r greater than the width of the transmission region t, more ambient light can be reflected in the reflection mode, whereby the brightness can be increased. Therefore, optical loss is reduced and optical efficiency is improved, compared to the related art.

However, if the width of the reflection region r is greater than that of the transmission region, the width of the transmission region t is relatively small, so that the amount of light provided from the backlight assembly 440 through the transmission region t is reduced. The light guiding pattern 432 helps to mitigate this problem.

Figure 5:
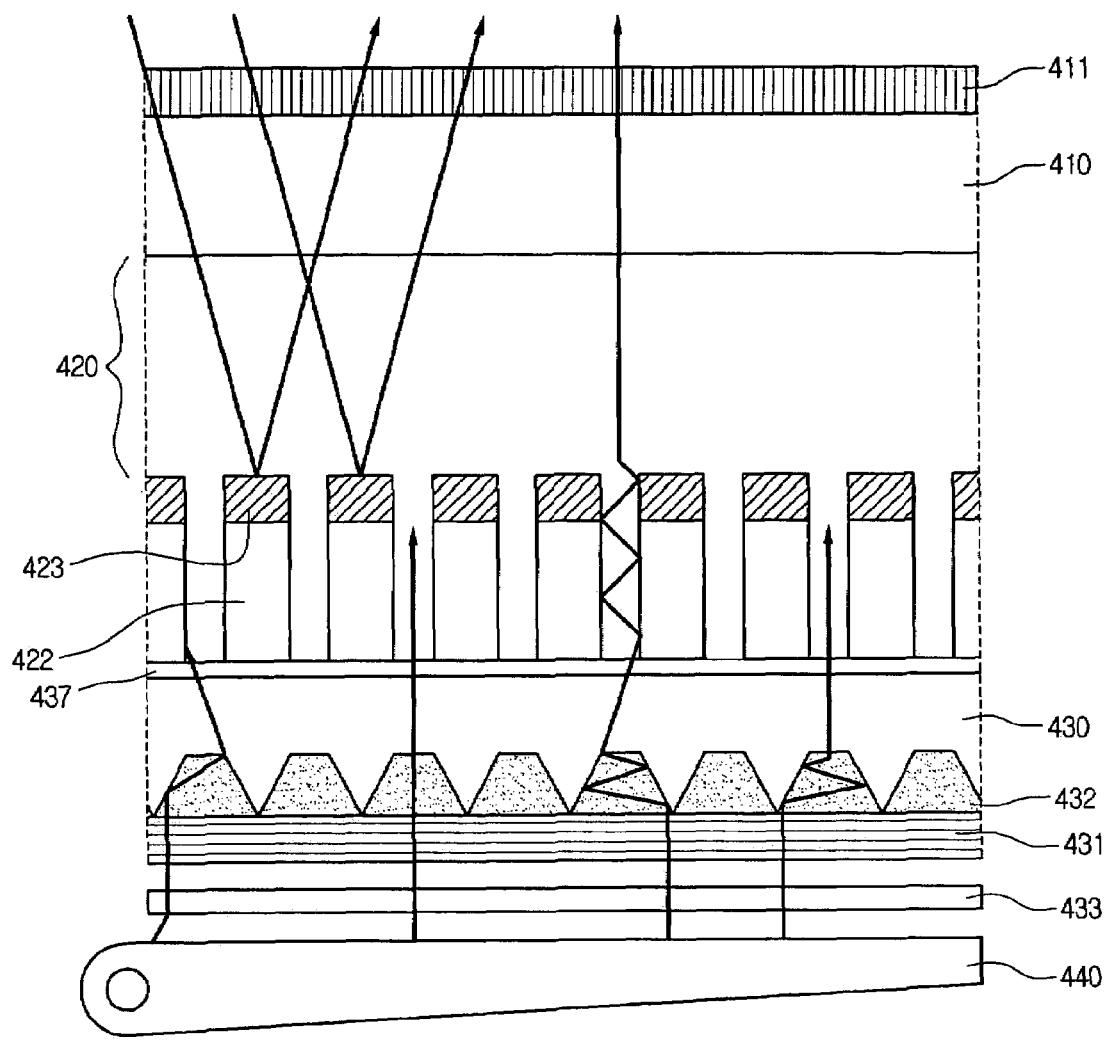
FIG. 5 is a drawing showing a status in which light progresses by a light guiding pattern of the present invention in transmission mode.

FIG. 5 shows how light is affected by the light guiding pattern in the transmission mode. As shown in FIG. 5, in the transmission mode, light generated from the backlight assembly 440 is modulated into parallel light by the collimator 433 and provided to the first substrate 430 by way of the first polarizing plate 431.

A light guiding pattern 432 capable of guiding light is formed on the first substrate 430. The light guiding pattern 432 transmits incident light to be provided without any optical loss, to the transmission region t, through total internal reflection of the incident light. The light guiding pattern 432 is formed at the position that corresponds to the transmission region, which permits light that has traveled through using total internal reflection by the light guiding pattern 432 can be directly provided to the corresponding transmission region t.

Namely, light provided to the light guiding pattern 432 of the first substrate 430 is subject to total internal reflection inside the light guiding pattern 432 and is provided to the transmission region t. Therefore, since light generated from the backlight assembly 440 is provided to the transmission region t without any optical loss, the brightness is increased and the optical efficiency can be improved.

FIG. 6 is a schematic view showing a condition under which the total internal reflection occurs generally. As shown in FIG. 6A, the relation between light transmitted and provided to and from media having different refractive indexes $n_i$ and $n_t$, is given by the following formula:

$$\sin \theta_i = n_t/n_i \sin \theta_t$$

Here, $\theta_i$ represents an incident angle, $\theta_t$ represents a transmission angle, $n_i$ represents a refractive index of a medium through which light is provided, and $n_t$ represents a refractive index of a medium to which light is transmitted.

As revealed by the above formula, if the refractive index $n_i$ of the medium through which light is provided is greater than the refractive index $n_t$ of the medium to which light is transmitted, the transmission angle $\theta_t$ is greater than the incident angle $\theta_i$.

Figure 6A:
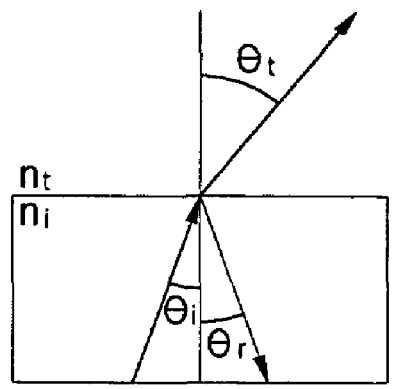
FIGS. 6A, 6B, 6C and 6D show the condition under which the total internal reflection occurs generally.
Figure 6B:
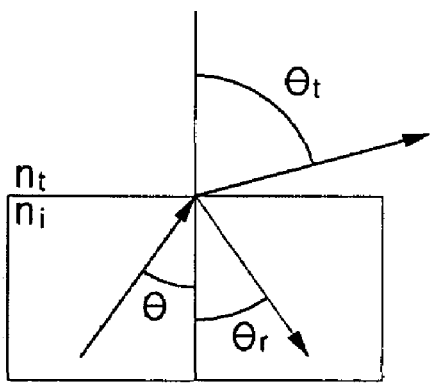

As shown in FIG. 6B, as the incident angle $\theta_i$ increases the transmission angle $\theta_t$ also increases. Accordingly, the transmitted light approaches the boundary between the two media and the amount of transmitted light is greater than in the amount of reflected light.

Figure 6C:
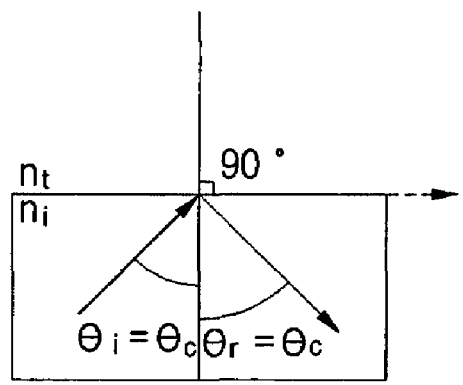
Figure 6D:
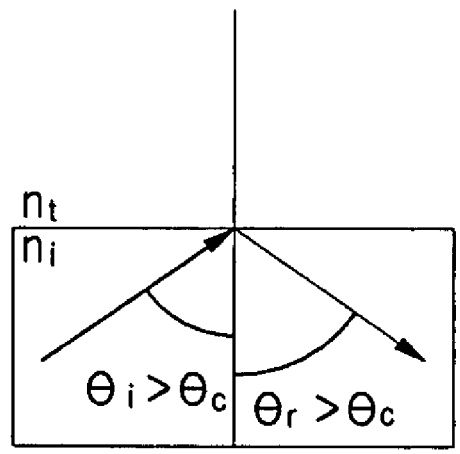

Eventually, as shown in FIG. 6C, when the transmission angle $\theta_t$ becomes 90°, the incident light is neither transmitted nor reflected. The incident angle $\theta_i$ when the transmission angle $\theta_t$ becomes 90°, is called a critical angle $\theta_c$. As shown in FIG. 6D, light provided at an angle greater than the critical angle $\theta_c$ is completely reflected by total internal reflection.

Figure 7:
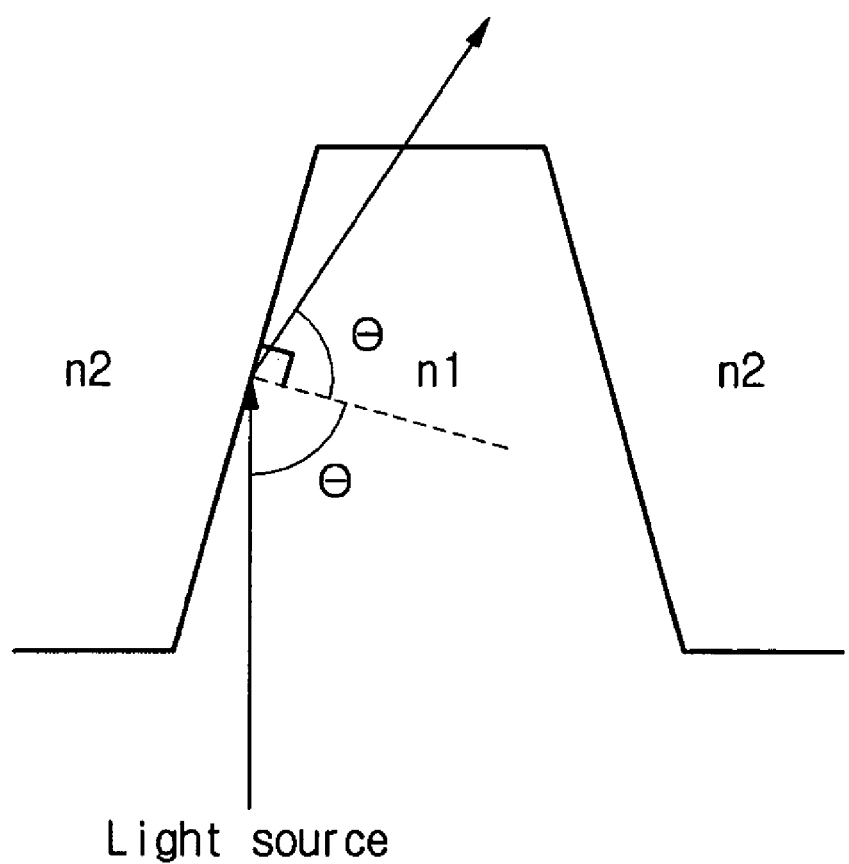
FIG. 7 is a drawing showing a total internal reflection path of light by a light guiding pattern of the present invention.

FIG. 7 is a drawing showing a total internal reflection path of light by the light guiding pattern. As shown in FIG. 7, to meet the total internal reflection condition, $n_1$ is greater than $n_2$ ($n_1 > n_2$). Here, $n_1$ represents the refractive index of the light guiding pattern 432 and $n_2$ represents the refractive index of the first substrate 430.

Also, the incident angle θ is greater than the critical angle ($\theta_c$=arcsin ($n_2/n_1$)). Therefore, light that satisfies the above two conditions is not transmitted but completely reflected by total internal reflection. Here, θ represents an incident angle of the light guiding pattern 432 and $\theta_c$ represents the critical angle. At this time, it should be noted that the reflective angle equals the incident angle.

Therefore, the refractive index $n_1$ of the light guiding pattern 432 is at least greater than the refractive index $n_2$ of the first substrate 430. Generally, since the refractive index $n_2$ of the first substrate 430 is about 1.5, the refractive index $n_1$ of the light guiding pattern 432 is at least greater than 1.5.

Also, to get the incident light to be provided in the direction of the first substrate 430 by total internal reflection, the light guiding pattern 432 is tapered from a lower part thereof to an upper part. By tapering the width of the upper part compared to that of the lower part, incident light is repeatedly reflected inside the light guiding pattern 432 by total internal reflection and provided to the first substrate 430.

Therefore, the transflective type LCD device of the present invention can improve the optical efficiency through increase in optical transmittance by forming a light guiding pattern 432 for guiding light in the direction of the first substrate 430 and providing the light from the backlight assembly 440 completely to the transmission region t of the first substrate 430 without any optical loss.

Also, the transflective type LCD device having the foregoing construction improves reflection efficiency by making the reflection region r having a larger width than that of the transmission region t so that a greater amount of incident ambient light is reflected upon the reflection mode, and improves optical transmittance by forming the light guiding pattern 432 so that light provided from the backlight assembly 440 is completely guided to the transmission region t by total internal reflection. As described above, the transflective type LCD device of the present invention can maximize the optical efficiency in both the reflection mode and the transmission mode.

Figure 8A:
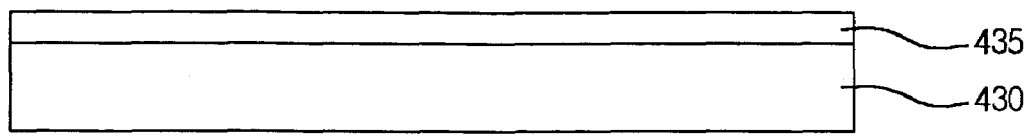
FIGS. 8A, 8B and 8C are sectional views illustrating a method for forming a light guiding pattern on a first substrate of a transflective type LCD device.
Figure 8B:
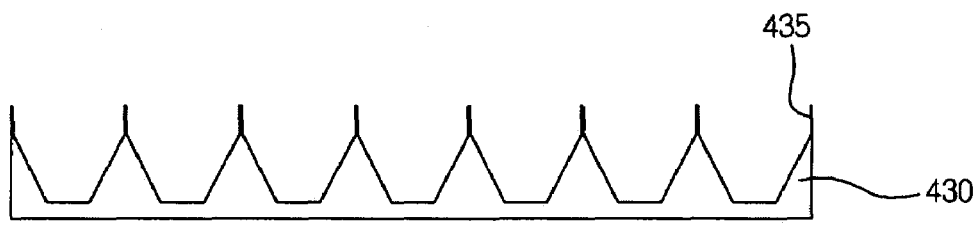
Figure 8C:
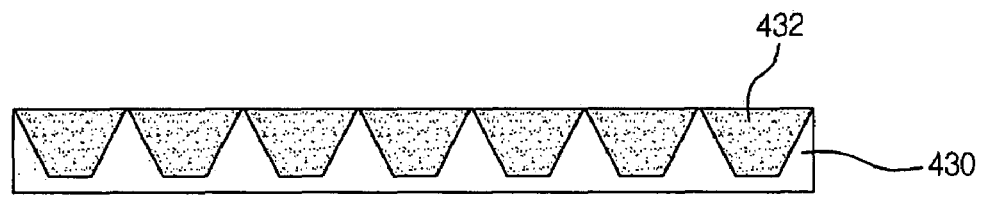

In the meantime, FIGS. 8A through 8C are drawings explaining a manufacturing process for forming the light guiding pattern on the first substrate of the transflective type LCD device.

As shown in FIG. 8A, a V-shaped pattern is formed on one side of the first substrate 430 by etching. For example, if the first substrate 430 is etched using photolithography, a positive or negative type photoresist is coated on the first substrate 430 so that a photoresist layer 435 is formed.

Subsequently, as shown in FIG. 8B, an exposure mask (not shown) is positioned above the photoresist layer 435 and a specific portion of the photoresist layer 435 is exposed to exposure light of a particular wavelength. Thereafter, the exposed photoresist layer 435 is developed so that a predetermined pattern is formed. Etching is then performed using the patterned photoresist layer 435 as a mask.

More specifically, etchant partially passes through the patterned photoresist layer 435 and reacts with the first substrate 430. Subsequently, by removing the patterned photoresist layer 435, a V-shaped pattern is formed on the first substrate 430. The V-shaped pattern is tapered such that the surface of the pattern has a larger width than the end of the V-shaped pattern inside the first substrate 430.

As shown in FIG. 8C, the light guiding pattern 432 made of a medium having the refractive index different from the first substrate 430 is formed on the V-shaped pattern. The light guiding pattern 432 has a refractive index greater than the refractive index of the first substrate 430 so that total internal reflection may occur.

Figure 9:
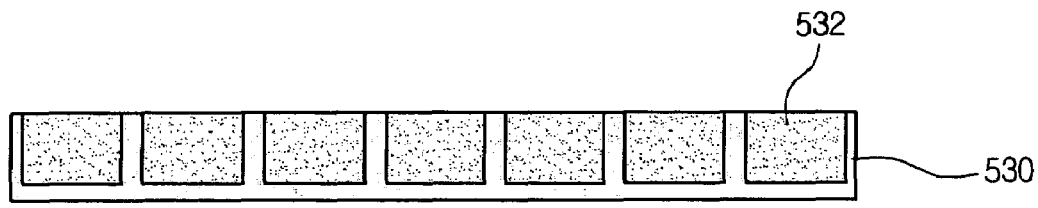
FIG. 9 illustrates a light guiding pattern formed in a rectangular pattern.

Alternatively, as shown in FIG. 9, the light guiding pattern 532 may be formed on a first substrate 530 in rectangular shape.

As is apparent from the foregoing, the optical transmittance is increased by forming a light guiding pattern on a first substrate so that light provided from a backlight assembly is guided in the transmission mode. Also, the optical reflectance is increased by increasing the width of the reflection region formed on the first substrate so that more ambient light is reflected in the reflection mode. Thus, the optical efficiency is increased by increasing the optical reflectance and transmittance in the transflective type LCD device having a reflection mode and a transmission mode.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A transflective type liquid crystal display device comprising:

a first substrate;
a light guiding pattern containing a medium whose refractive index is different from a refractive index of the first substrate, the light guiding pattern being disposed on an outer side of the first substrate;
a second substrate facing the first substrate;
a liquid crystal layer containing liquid crystals injected between the first and the second substrates; and
a backlight assembly arranged on an outer surface of the first substrate, each element of the light guiding pattern being operative to guide light to a transmission region by reflecting light provided from the backlight assembly inside the light guiding pattern using total internal reflection.

2. The transflective type liquid crystal display device according to claim 1, further comprising a reflector disposed on an inside side of the first substrate as another light guiding pattern, the reflector defining a reflection region and the transmission region such that the reflector is present in the reflection region and the reflector is not present in the transmission region.

3. The transflective type liquid crystal display device according to claim 2, wherein a cell gap in the transmission region is twice a cell gap in the reflection region.

4. The transflective type liquid crystal display device according to claim 2, wherein the reflection region has a greater width than the transmission region.

5. The transflective type liquid crystal display device according to claim 2, further comprising a passivation layer on which the reflector is disposed.

6. The transflective type liquid crystal display device according to claim 5, wherein the passivation layer is disposed only in the reflection region.

7. The transflective type liquid crystal display device according to claim 5, further comprising a transparent electrode on which the passivation layer is disposed.

8. The transflective type liquid crystal display device according to claim 2, wherein each element of the light guiding pattern corresponds with the transmission region, and a width of each element of the light guiding pattern is greater than a width of the corresponding portion of the transmission region.

9. The transflective type liquid crystal display device according to claim 1, further comprising first and second polarizing plates, whose optical transmission axes are perpendicular each other, arranged on outer surfaces of the first and the second substrates, respectively.

10. The transflective type liquid crystal display device according to claim 1, further comprising a collimator arranged between the first substrate and the backlight assembly, the collimator for modulating light provided from the backlight assembly into parallel light.

11. The transflective type liquid crystal display device according to claim 1, wherein each element of the light guiding pattern is formed in a position that corresponds to a transmission region.

12. The transflective type liquid crystal display device according to claim 11, wherein a majority of the light guiding pattern is formed in a position that corresponds to the transmission region.

13. The transflective type liquid crystal display device according to claim 1, wherein a refractive index of the light guiding pattern is greater than a refractive index of the first substrate.

14. The transflective type liquid crystal display device according to claim 1, wherein the light guiding pattern is tapered such that a width of the light guiding pattern decreases with decreasing distance to the liquid crystal layer.

15. The transflective type liquid crystal display device according to claim 1, wherein the light guiding pattern is a V-shaped pattern.

16. The transflective type liquid crystal display device according to claim 1, wherein the light guiding pattern is a rectangular shaped pattern.

17. The transflective type liquid crystal display device according to claim 1, wherein the light guiding pattern is a periodic structure.

18. The transflective type liquid crystal display device according to claim 1, wherein the light guiding pattern extends from the outer surface of the first substrate towards the liquid crystal layer.

19. The transflective type liquid crystal display device according to claim 18, wherein the light guiding pattern terminates before reaching an inner surface of the first substrate opposing the outer surface of the first substrate.

20. The transflective type liquid crystal display device according to claim 18, wherein the light guiding pattern at the outer surface of the first substrate covers substantially all of the outer surface of the first substrate.

21. A display device comprising:
a light provider; and
a substrate having a periodic light guiding pattern formed therein, the light guiding pattern and substrate having different refractive indices that are different enough such that light from the light provider entering the light guiding pattern is reflected by total internal reflection inside the light guiding pattern and progressed towards a front surface of the display device.

22. The display device according to claim 21, further comprising a reflector disposed on a reflecting region of an inside side of the substrate as another light guiding pattern, a transmission region of the opposing side of the substrate devoid of the reflector.

23. The display device according to claim 22, wherein a cell gap in the transmission region is twice a cell gap in the reflection region.

24. The display device according to claim 22, wherein the reflection region has a greater width than the transmission region.

25. The display device according to claim 22, further comprising a passivation layer on which the reflector is disposed, the passivation layer disposed only in the reflection region.

26. The display device according to claim 25, further comprising a transparent electrode disposed on the substrate and on which the passivation layer is disposed.

27. The display device according to claim 22, wherein each element of the light guiding pattern corresponds with the transmission region, and a width of each element of the light guiding pattern is greater than a width of the corresponding portion of the transmission region.

28. The display device according to claim 21, wherein the light guiding pattern extends from a surface of the substrate facing the light provider and terminates before reaching an opposing surface.

* * * * *